United States Patent [19]

Comerford

[11] Patent Number: 5,481,596
[45] Date of Patent: Jan. 2, 1996

[54] AUXILIARY BASEBAND TELEPHONE INTERFACE FOR AN ANSWERING MACHINE

[75] Inventor: Timothy N. Comerford, Indianapolis, Ind.

[73] Assignee: AT&T Corp., Murray Hill, N.J.

[21] Appl. No.: 247,200

[22] Filed: May 26, 1994

[51] Int. Cl.$^6$ .................................................. H04M 1/64
[52] U.S. Cl. ............................. 379/67; 379/70; 379/77
[58] Field of Search .................... 379/77, 70, 67, 379/442, 88, 85

[56] References Cited

U.S. PATENT DOCUMENTS

| | | | |
|---|---|---|---|
| 4,742,538 | 5/1988 | Szlam | 379/361 |
| 4,881,259 | 11/1989 | Scordato | 379/58 |
| 4,901,343 | 2/1990 | Yamaguchi | 379/93 |
| 4,941,203 | 7/1990 | Patsiokas et al. | 79/67 X |
| 4,974,253 | 11/1990 | Hashimoto | 379/100 |
| 5,081,668 | 1/1992 | Ito | 379/58 |
| 5,220,594 | 6/1993 | Ohnishi et al. | 379/61 |

FOREIGN PATENT DOCUMENTS 3011758  10/1981  Germany .................................. 379/70

*Primary Examiner*—Thomas W. Brown
*Attorney, Agent, or Firm*—Thomas Stafford

[57] ABSTRACT

An auxiliary baseband telephone instrument interface is provided in an answering machine to which any auxiliary telephone instrument, whether corded or cordless, can be connected and can control the answering machine functionality by use of in-band control signals. More specifically, a controllable switch arrangement is employed to connect outputs of an auxiliary instrument jack to outputs of a telephone line jack to which the answering machine is connected, or to the answering machine functionality itself and to disconnect the outputs of the auxiliary jack from the outputs of the telephone line jack or the answering machine functionality. Use of unidirectional paths controlled by a plurality of switching elements allows the user of an auxiliary telephone instrument connected to the auxiliary instrument jack to privately screen incoming calls on a telephone line connected to the telephone line jack, which the answering machine has answered and to controllably access other remote features of the answering machine. During the private screening of a call, a user of the auxiliary telephone instrument can interrupt the answering machine operations by entering an in-band control signal and thereby intercept the answered call. Additionally, use of the controllable switch array enables a user of the auxiliary telephone instrument to answer incoming calls, if desired, or to make outgoing calls, if desired.

14 Claims, 11 Drawing Sheets

AUXILIARY BASEBAND TELEPHONE INTERFACE FOR AN ANSWERING MACHINE

TECHNICAL FIELD

This invention relates to telephone arrangements and, more particularly, to telephone answering machines.

BACKGROUND OF THE INVENTION

Telephone answering machines are now commonly in use and include a number of features which allow a user to screen calls, intercept calls, play back recorded messages, record an announcement, among others. Typically, the user could access the answering machine features either at the answering machine itself or from a remote location via a telephone. More recently, answering machines have been incorporated into the base stations of cordless telephones and the user has been able to access the answering machine features using a remote cordless handset. However, in so doing the signals required to access the individual features were out-of-band pilot tones that had to be incorporated in the radio frequency (RF) cordless telephone transmission signal. That is, the protocols for accessing the answering machine features had to be built into the RF protocol of the cordless telephone base station and handset. Consequently, the answering machine and the cordless telephone had to be closely coupled to each other. This close coupling, unfortunately, required that if a user wanted a new answering machine and/or a new cordless phone, he or she would have to purchase both instruments. This is undesirable and expensive.

SUMMARY OF THE INVENTION

The limitations and problems of prior telephone answering machines are overcome by providing an auxiliary baseband telephone instrument interface to which any auxiliary telephone instrument, whether corded or cordless, can be connected and can control an answering machine by use of in-band control signals.

More specifically, a controllable switch arrangement is employed to connect outputs of an auxiliary instrument jack to outputs of a telephone line jack to which the answering machine is connected, or to the answering machine functionality itself and to disconnect the outputs of the auxiliary jack from the outputs of the telephone line jack or the answering machine functionality. Use of unidirectional paths controlled by a plurality of switching elements allows the user of an auxiliary telephone instrument connected to the auxiliary instrument jack to privately screen incoming calls on a telephone line connected to the telephone line jack, which the answering machine has answered and to controllably access other remote features of the answering machine. During the private screening of a call, a user of the auxiliary telephone instrument can interrupt the answering machine operations by entering an in-band control signal and thereby intercept the answered call. Additionally, use of the controllable switch array enables a user of the auxiliary telephone instrument to answer incoming calls, if desired, or to make outgoing calls, if desired.

In one embodiment of the invention, connection of the outputs of the auxiliary instrument jack to the outputs of the line jack is delayed for a predetermined interval upon an auxiliary telephone instrument connected to the auxiliary instrument jack going off-Hook.

In another embodiment of the invention, the outputs of the auxiliary instrument jack are initially connected to the outputs of the line jack.

In one other embodiment of the invention, connection of the outputs of the auxiliary instrument jack to the outputs of the line jack is inhibited until a predetermined in-band control signal is detected.

A technical advantage of the invention is that it enables use of conventional telephone instruments whether corded or cordless without requiring modification of that telephone instrument or the answering machine.

DETAILED DESCRIPTION

Figure 1:
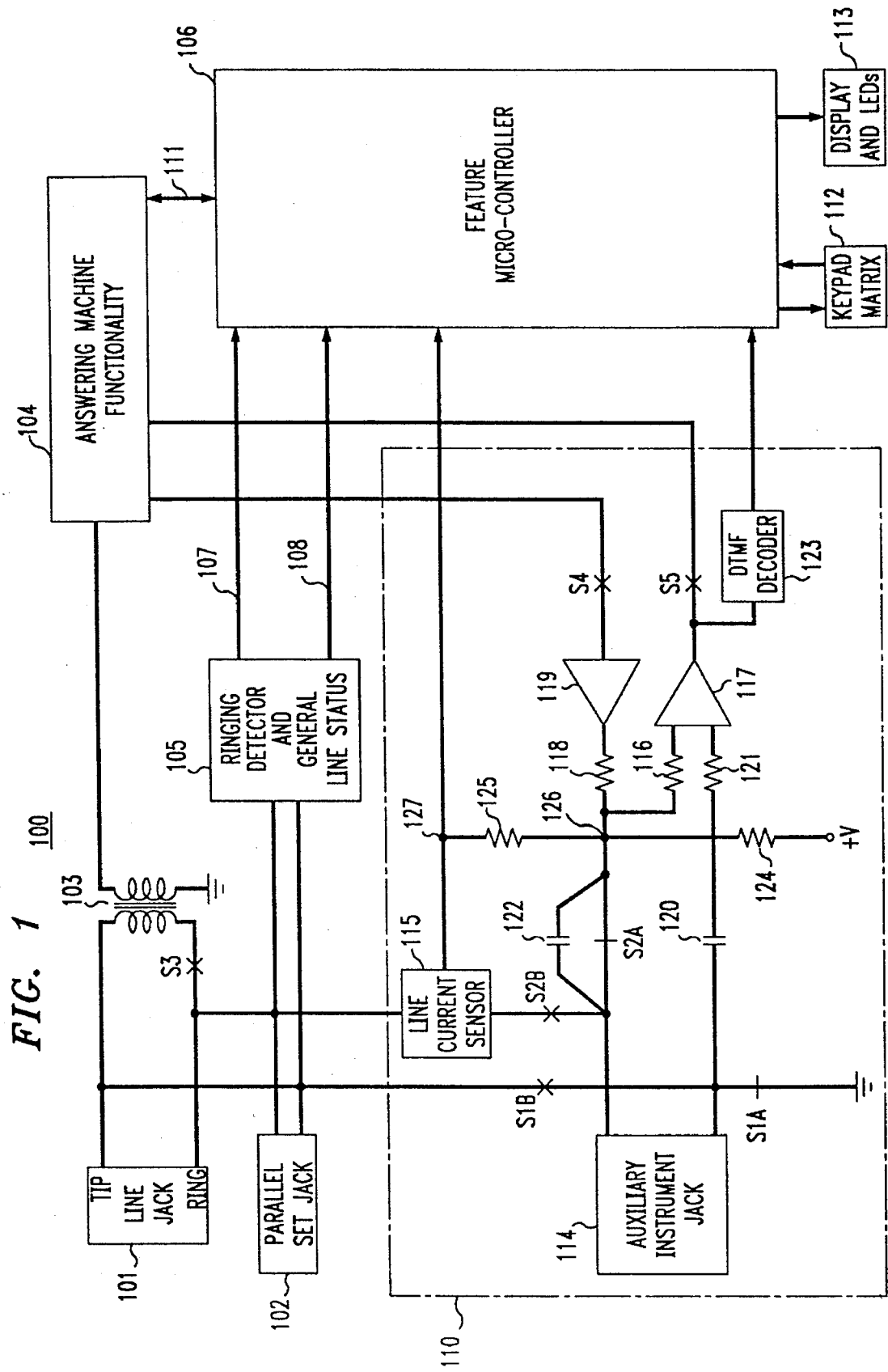
FIG. 1 shows in simplified block diagram form details of a telephone answering machine including an embodiment of the invention.

FIG. 1 shows in simplified block diagram form details of an answering machine 100 including an embodiment of the invention. Shown is line jack 101 for connecting to the tip and ring leads of a telephone line and parallel set jack 102 connected in parallel with the tip and ring lead outputs from line jack 101. Jacks 101 and 102 are connected via switch S3 and transformer 103 to the answering machine functionality unit 104. Switch S3 is employed under control of feature micro-controller 106 for the answering machine to go off-hook or on-hook, in well known manner. Normally, switch S3 is in an open circuit condition during idle intervals of the answering machine. Answering machine functionality unit 104 is employed, in well known fashion, for recording incoming messages, recording an announcement to be played out, playing out messages, among other well known locally or remotely controlled functions. Ringing detector and general line status unit 105 is also connected in parallel with the tip and ring leads of the telephone line and is employed to detect incoming ringing signals and also to detect when a telephone instrument connected either to parallel set jack 102 or anywhere on the telephone line goes off-hook or on-hook. This off-hook or on-hook detection is referred to as "general line status", i.e., is the telephone line active or idle, respectively. Such ringing detectors and general line status units are well known in the art. An indication of ringing signal is supplied to feature micro-controller 106 via line 107 and an indication of the line status is supplied to feature micro-controller 106 via line 108. Feature micro-controller 106 is programmed for controlling the typical answering machine functionality and also for controlling the baseband auxiliary interface 110. To this end, control information and the like are supplied to answering machine functionality unit 104 via bus 111. Keypad matrix 112 is employed for locally controlling the answering machine. Display LEDs 113 are employed to illustrate the operating modes of the answering machine.

Baseband auxiliary telephone instrument interface 110 includes auxiliary instrument jack 114 for connecting to an auxiliary telephone instrument. The auxiliary telephone instrument may be the base station of a cordless telephone, a corded telephone or other telephone instrument, for example, a key telephone system or the like. Auxiliary instrument jack 114 is controllably connected to the tip and ring outputs of line jack 101 via switch elements S1B and S2B. In this example, auxiliary instrument jack 114 is connected to the ring output of line jack 101 through line current sensor 115. Line current sensor 115 is employed to detect whether or not an auxiliary telephone instrument connected to auxiliary instrument jack 114 is off-hook when it is connected to the tip and ring outputs of line jack 101, and a telephone line connected thereto, via switch elements S1B and S2B. Additionally, auxiliary instrument jack 114 is connected to answering machine functionality unit 104 via switch element S1A which is connected to ground potential and switch element S2A. Unidirectional paths are connected to auxiliary instrument jack 114 via switch elements S2A and S1A. One of the unidirectional paths includes resistor 116, amplifier 117 and switch element S5 for accessing the answering machine functionality unit 104 and its operational features. The other unidirectional path includes resistor 118, amplifier 119 and switch element S4 for receiving messages, announcements and the like from answering machine functionality unit 104. The tip lead output of auxiliary instrument jack 114 is capacitively coupled via capacitor 120 and resistor 121 to amplifier 117. Additionally, switch element S2A is bypassed by capacitor 122 so that in-band tone signals can be coupled to dual tone multifrequency (DTMF) decoder 123 when switch elements S1A and S2A are in an open circuit condition. The reason for this is so that a user of a telephone instrument connected to auxiliary instrument jack 114 can signal via a DTMF tone that he or she wants to access answering machine functionality unit 104. This can be done by employing predetermined ones of the touch tone buttons on the auxiliary telephone instrument to supply appropriate DTMF signals to DTMF decoder 123 and, in turn, to feature micro-controller 106 indicating that the user of the auxiliary telephone instrument desires to access the answering machine functionality. Although DTMF signals are employed in this example, it will be apparent that other in-band single tone signals or combinations thereof may also be employed. It is further noted that the outputs of general line status unit 105 and line current sensor 115 are considered in-band control signals. Control may also be realized by employed other in-band control signals such as "flash", depression of the switch hook, dial pulses, or the like. In this example, in-band is the telephone frequency band of approximately zero (0) to 4000 Hz. It will be apparent that signals slightly outside of this frequency range could also be considered in-band.

Resistor 124 is connected between a source of potential +V and circuit point 126, which is connected via switch element S2A to the ring lead output of auxiliary instrument jack 114. Resistor 125 is connected from circuit point 126 and is wire ORED to the output from line current sensor 115 at circuit point 127. The ORED connection at circuit point 127 is supplied as an input to feature micro-controller 106. Values of resistors 124 and 125 and potential +V are such that battery feed is available to be supplied to an auxiliary telephone instrument and such that it can be determined when the auxiliary telephone instrument connected to auxiliary instrument jack 114 goes off-hook when switch elements S1A and S2A are closed. An indication of this off-hook condition is supplied to feature micro-controller 106. It is further noted that the battery feed provided by potential V+ and resistor 124 is isolated from the Tip and Ring outputs of connector 101 by the operation of switch elements S1A, S2A, S1B and S2B.

It is noted that in this embodiment of this invention switch elements S1A, S1B, S2A, S2B, S3, S4 and S5 are relay contacts; however, any controllable switch element may equally be employed. Additionally, when switch elements S1A and S2A are closed, switch elements S1B and S2B are open and vice versa.

Figure 2:
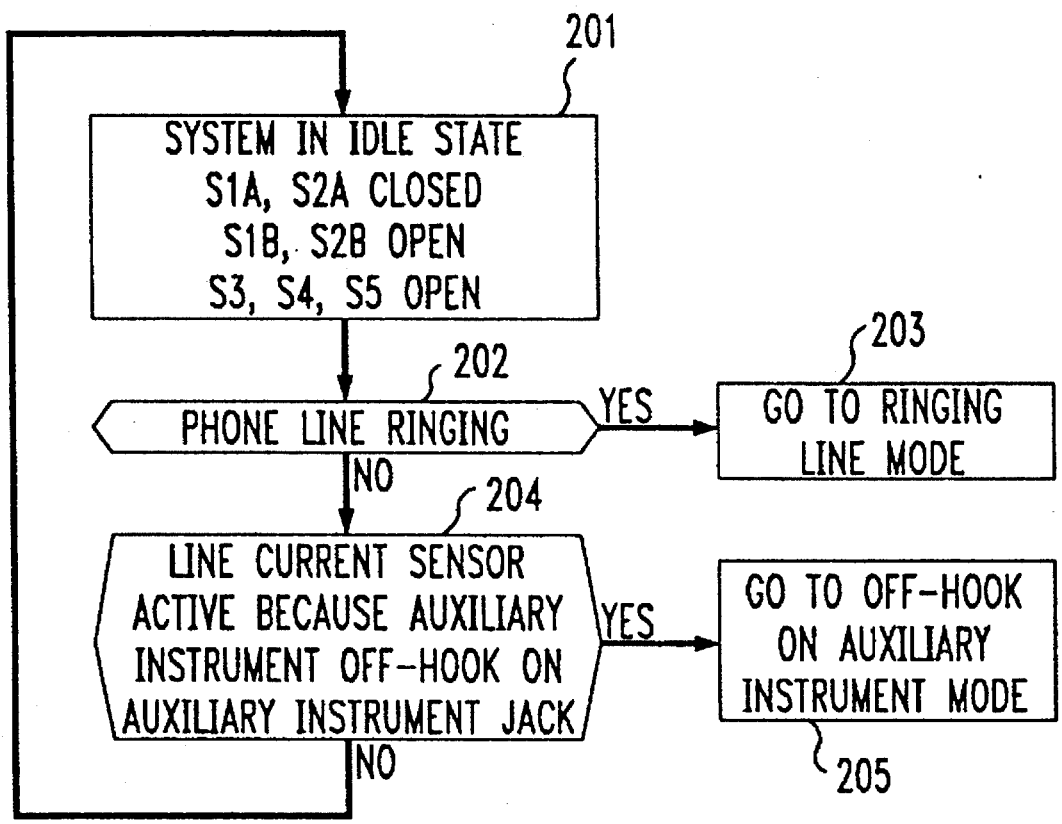
FIG. 2 is a flow chart illustrating the operation the embodiment of the invention shown in FIG. 1.
Figure 3:
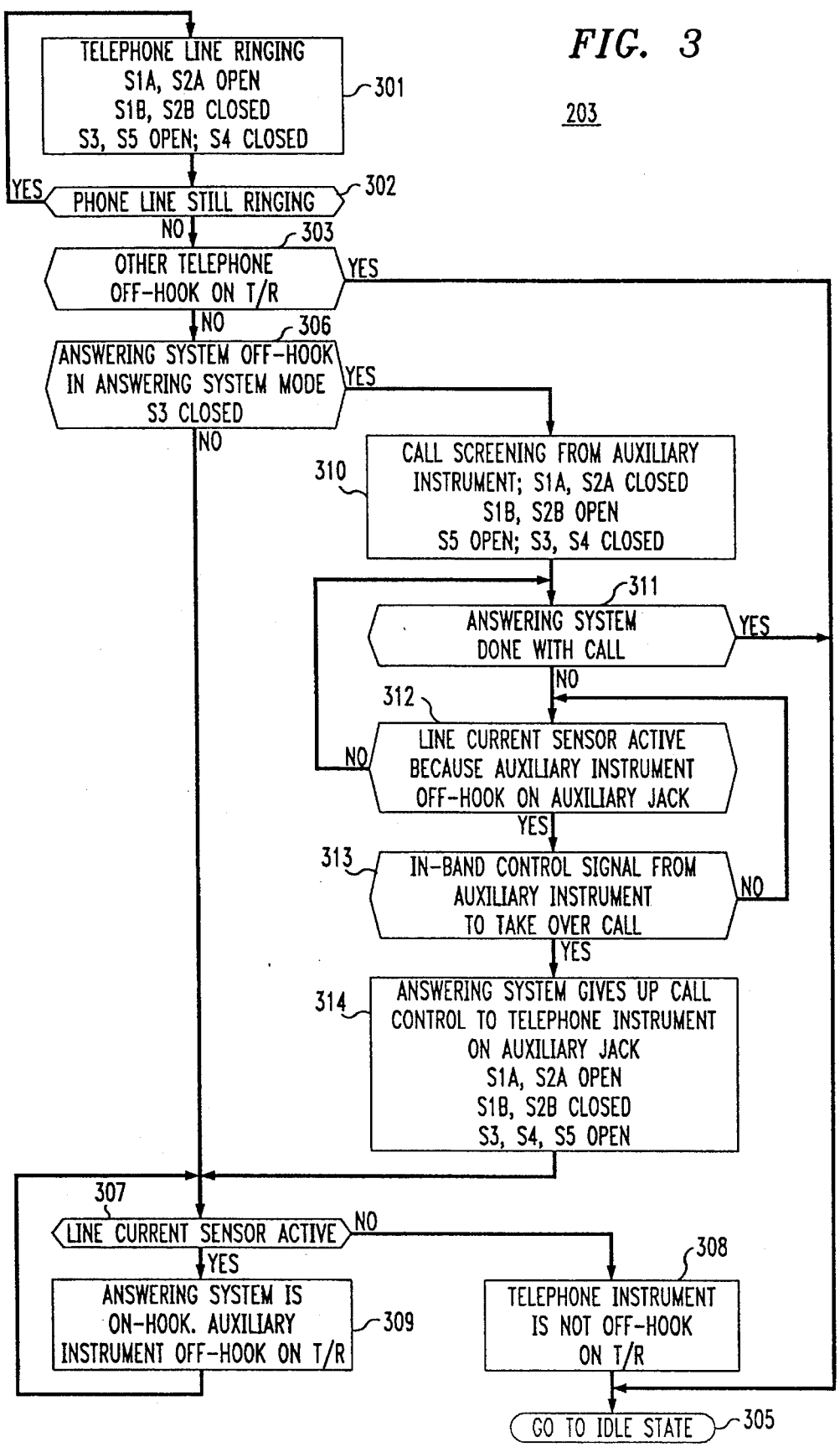
FIG. 3 is a flow chart illustrating the operation of the Go To Ringing Line mode subroutine employed in FIG. 2.
Figure 4:
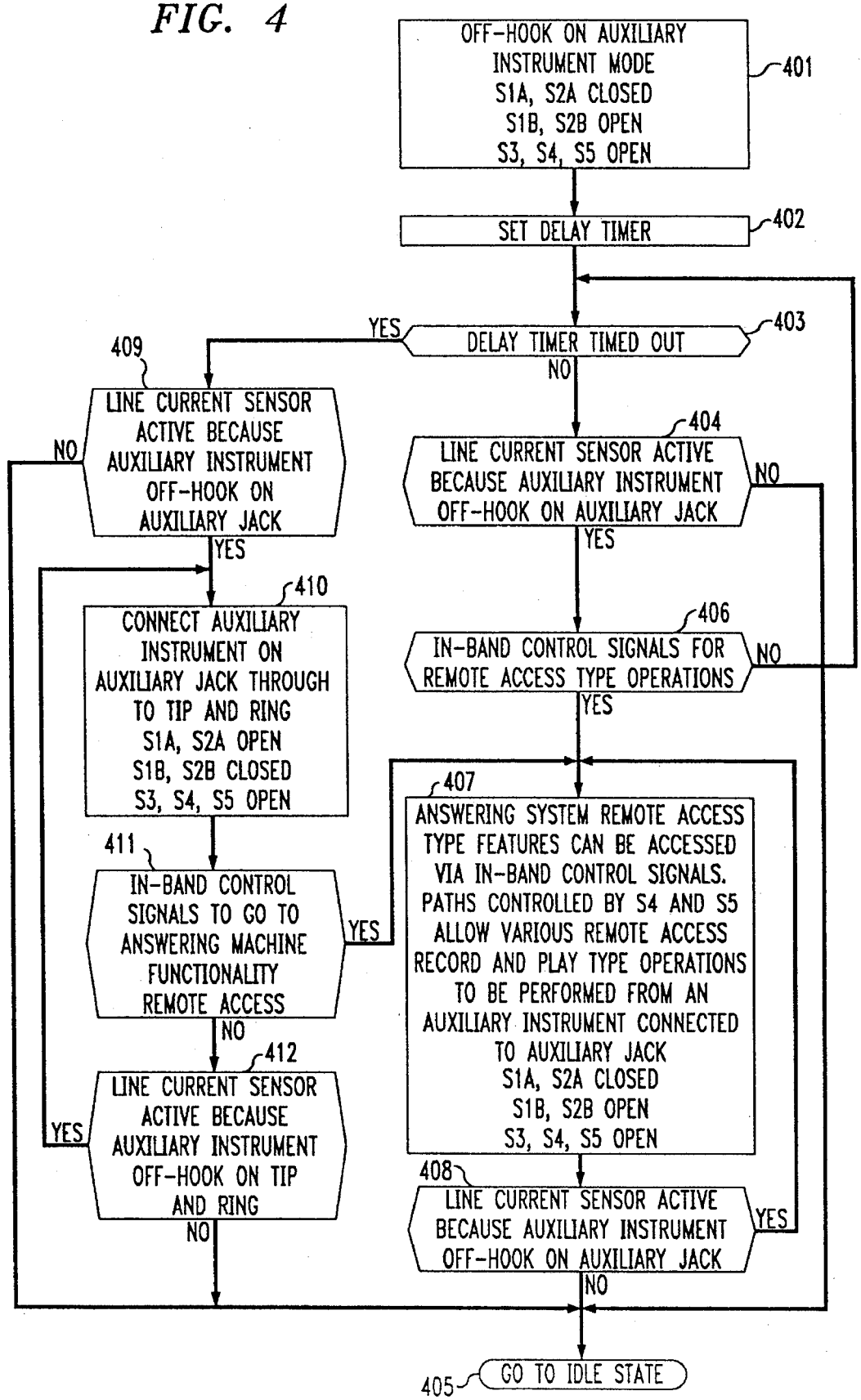
FIG. 4 is a flow chart illustrating the operation of the Go To Off-Hook On Auxiliary Instrument mode subroutine employed in FIG. 2.

Operation of the embodiment of the invention shown in FIG. 1 may best be described by referring to the flow chart shown in FIG. 2. After the answering machine has been installed and power has been turned on, it will enter idle state 201. In idle state 201, switch elements S1A and S2A are closed. This closed condition of switch elements S1A and S2A allows feature micro-controller 106 to detect via potential +V and resistors 124 and 125 when an auxiliary telephone instrument connected to auxiliary instrument jack 114 goes off-hook. In the idle state 201, switch elements S1B and S2B are open, thereby disconnecting the tip and ring lead outputs of auxiliary instrument jack 114 from the tip and ring outputs of line jack 101 and any telephone line connected thereto. Similarly, in idle state 201, switch element S3 is open and the answering machine is thereby in the on-hook state. Additionally, switch elements S4 and S5 are open, disconnecting the answering machine functionality unit 104 from the outputs of auxiliary instrument jack 114. Step 202 tests to determine whether or not a ringing signal is being received from the telephone line. If the test result in step 202 is YES, feature micro-controller 106 calls Go To Ringing Line mode subroutine via step 203. The Go To Ringing Line mode subroutine is shown in FIG. 3 and is described below. If the test result in step 202 is NO, step 204 tests to determine if there is a line current sensor active indication, i.e., an in-band control signal, because the auxiliary telephone instrument connected to auxiliary instrument jack 114 has gone off-hook. As indicated above, the line current sensor indication is realized by use of potential +V and resistors 124 and 125. If the test result in step 204 is YES, feature micro-controller 106 calls the Go To Off-Hook On Auxiliary Instrument mode subroutine via step 205. The Go To Off-hook On Auxiliary Instrument mode subroutine is shown in FIG. 4 and described below. If the test result in step 204 is NO, control is returned to step 201 and the idle state is entered.

FIG. 3 is a flow chart illustrating the Go To Ringing Line mode subroutine 203 employed in the flow chart of FIG. 2. When ringing is detected, feature micro-controller 106 enters step 301. Switch elements S1A and S2A are caused to be open, switch elements S1B and S2B are caused to be closed, switch elements S3 and S5 remain open and switch element S4 is closed. Consequently, the tip and ring leads of auxiliary telephone jack 114 are connected via switch elements S1B and S2B to the tip and ring leads of the telephone line. Additionally, switch elements S1A and S2A being opened disconnects the auxiliary instrument jack 114 from the answering machine functionality. This allows a user of a telephone instrument connected to auxiliary instrument jack 114 to intercept the incoming call if so desired in normal fashion. Step 302 tests to determine whether the telephone line is still ringing. If the test result in step 302 is YES, steps 301 and 302 are iterated until the test result in step 302 is NO and the telephone line is no longer ringing. Then, step 303 determines whether or not another telephone instrument has gone off-hook on the tip and ring leads of the telephone line. If the test result in step 303 is YES, step 305 transfers control back to idle state 201 (FIG. 2). If the test result in step 303 is NO, step 306 tests to determine if the answering system has gone off-hook and switch element S3 has been closed. If the test result in step 306 is NO, step 307 tests to determine if the line current sensor 115 is providing an active indication. If the test result in step 307 is NO, step 308 indicates that the auxiliary telephone instrument is not off-hook and step 305 returns control to the idle state 201 (FIG. 2). If the test result in step 307 is YES, step 309 indicates that the answering machine is on-hook and the auxiliary telephone instrument is off-hook. Control is returned to step 307 and steps 307 and 309 are iterated until step 307 yields a NO result. Then, steps 308 and 305 operate as described above. Returning to step 306, if the test result is YES and the answering machine has gone off-hook, a user of the auxiliary telephone instrument can privately screen the incoming call being supplied to the answering machine functionality unit 104. The screening path is from answering machine functionality unit 104 (FIG. 1) via switch S4, amplifier 119, resistor 118 and switch element S2A to auxiliary instrument jack 114 and from auxiliary instrument jack 114 via switch element S1A to ground potential. To this end, switch elements S1A and S2A are closed, switch elements S1B and S2B are open, switch element S5 is open and switch elements S3 and S4 are closed. Since switch elements S1A, S2A and S4 are closed and switch elements S1B, S2B and S5 are open, the user of the auxiliary telephone instrument can listen in, i.e., screen the incoming call without being heard by the calling party. In this example, screening of the the incoming call is automatically available to a user if the auxiliary telephone instrument connected to auxiliary instrument jack 114 goes off-hook since switch element S4 is closed. The call screening function could easily be made into a manual function by leaving switch element S4 open and requiring the auxiliary telephone instrument user to enter an in-band control signal indicating that call screening is desired after going off-hook. Step 311 tests to determine if the answering system is done with the incoming call. If the test result in step 311 is YES, control is returned to the idle state 201 (FIG. 2) via step 305. If the test result in step 311 is NO, step 312 tests to determine whether the line current sensor comprised of potential +V and resistors 124 and 125 is providing an active indication, i.e., an in-band control signal, because the auxiliary telephone instrument has gone off-hook on auxiliary instrument jack 114. If the test result in step 312 is NO, control is returned to step 311 and steps 311 and 312 are iterated until step 311 yields a YES result. If the test result in step 312 is YES, the auxiliary telephone instrument connected to auxiliary instrument jack 114 has gone off-hook and step 313 tests to determine if an in-band control signal, e.g., a DTMF signal, from the auxiliary telephone instrument has been received indicating that the user wishes to intercept the call. If the test result in step 313 is YES, step 314 causes the answering machine to give up call control to the auxiliary telephone instrument on auxiliary instrument jack 114. To this end, switch elements S1A, S2A, S3, S4 and S5 are open, and S1B and S2B are closed. Thereafter, control is passed to step 307 which operates as described above. Returning to step 313, if the test result is NO, no in-band DTMF tone has been received and control is returned to step 312 which operates as described above. Eventually, upon completion of the call, control is returned to idle state 201 (FIG. 2) via step 305.

FIG. 4 is a flow chart of the Go To Off-Hook On Auxiliary Instrument mode subroutine 205, used in the flow chart of FIG. 2. Upon entering the Go To Off-Hook On Auxiliary Instrument mode subroutine 205, step 401 causes switch elements S1A and S2A to be closed, S1B and S2B to be open and switch elements S3, S4 and S5 to remain open. The condition of the switch elements is such as to allow a user of the auxiliary telephone instrument connected on auxiliary instrument jack 114 to access the answering machine functionality, if so desired. Step 402 causes a delay timer to be set to a predetermined interval. The interval may be any desired duration; for example, one to two seconds. This delay interval is important so that a user of the auxiliary telephone instrument does not cause a false off-hook indication to the central office, if he or she does not want to place a call but only wishes to access the answering machine functionality. Step 403 tests to determine if the delay interval has expired. If the test result in step 403 is NO, step 404 tests to determine if there is an active indication from the line current sensor, comprised of potential +V and resistors 124 and 125, indicating that the auxiliary telephone instrument has gone off-hook on auxiliary instrument jack 114. If the test result in step 404 is NO, step 405 passes control back to the idle state 201 (FIG. 2). If the test result in step 404 is YES, step 406 tests to determine if an in-band control signal, e.g., DTMF signal, has been detected via DTMF decoder 123 (FIG. 1). If the test result in step 404 is NO, control is returned to step 403. If the test result is step 406 is YES, step 407 causes switch elements S4 and S5 to be closed, thereby allowing remote access via in-band control signals, e.g., DTMF signals, from the auxiliary telephone instrument connected to auxiliary instrument jack 114 to access operations of answering machine functionality unit 104 (FIG. 1). Thereafter, step 408 tests to determine if an active indication from the line current sensor, comprised of potential +V and resistors 124 and 125, is being detected because the auxiliary instrument is off-hook on auxiliary instrument jack 114. If the test result in step 408 is YES, control is returned to step 407 and steps 407 and 408 are iterated until a NO result in step 408 is obtained. This NO result indicates that the auxiliary telephone instrument user has completed his or her interaction with the answering machine functionality. Upon step 408 yielding a NO result, control is again passed to idle state 201 (FIG. 2) via step 405. Returning to step 403, if the test result is YES the delay timer has timed out and step 409 tests to determine if a line current sensor active indication is being provided via potential +V and resistors 124 and 125 because the auxiliary telephone instrument is off-hook on auxiliary instrument jack 114. If the test result is NO, control is passed to idle state 201 (FIG. 2) via step 405. If the test result in step 409 is YES, step 410 causes the auxiliary telephone instrument on auxiliary instrument jack 114 to be connected through to the telephone line tip and ring leads. This is realized by causing switch elements S1A and S2A to be open, switch elements S1B and S2B to be closed and switch elements S3, S4 and S5 to be open. Then, step 411 tests to determine if in-band control signals, e.g., DTMF signals, have been detected to go to the answering machine remote access condition. If the test result in step 411 is NO, control is transferred to step 412. Thereafter, step 412 tests to determine if line current sensor 115 is providing an active line current indication, i.e., an in-band control signal, because the auxiliary instrument continues to be off-hook on the tip and ring leads of the telephone line. If the test result in step 412 is NO, control is passed to the idle state 201 via step 405. If the test result in step 412 is YES, the auxiliary telephone instrument is off-hook on the tip and ring leads of the telephone line and steps 410, 411 and 412 are iterated until step 411 yields a YES result or step 412 yields a NO result. This NO result in step 412 indicates that the auxiliary telephone instrument in on-hook and control is passed to idle state 201 (FIG. 2). Returning to step 411, if it yields a YES result, an in-band control signal, e.g., a DTMF signal, has been detected indicating that the user of the auxiliary telephone instrument on the auxiliary instrument jack wants to access the answering machine remote functionality and control is transferred to step 407. Steps 407 and 408 are iterated, as described above, until step 408 yields a NO result and control is transferred to idle state 201 (FIG. 2) via step 405.

Figure 5:
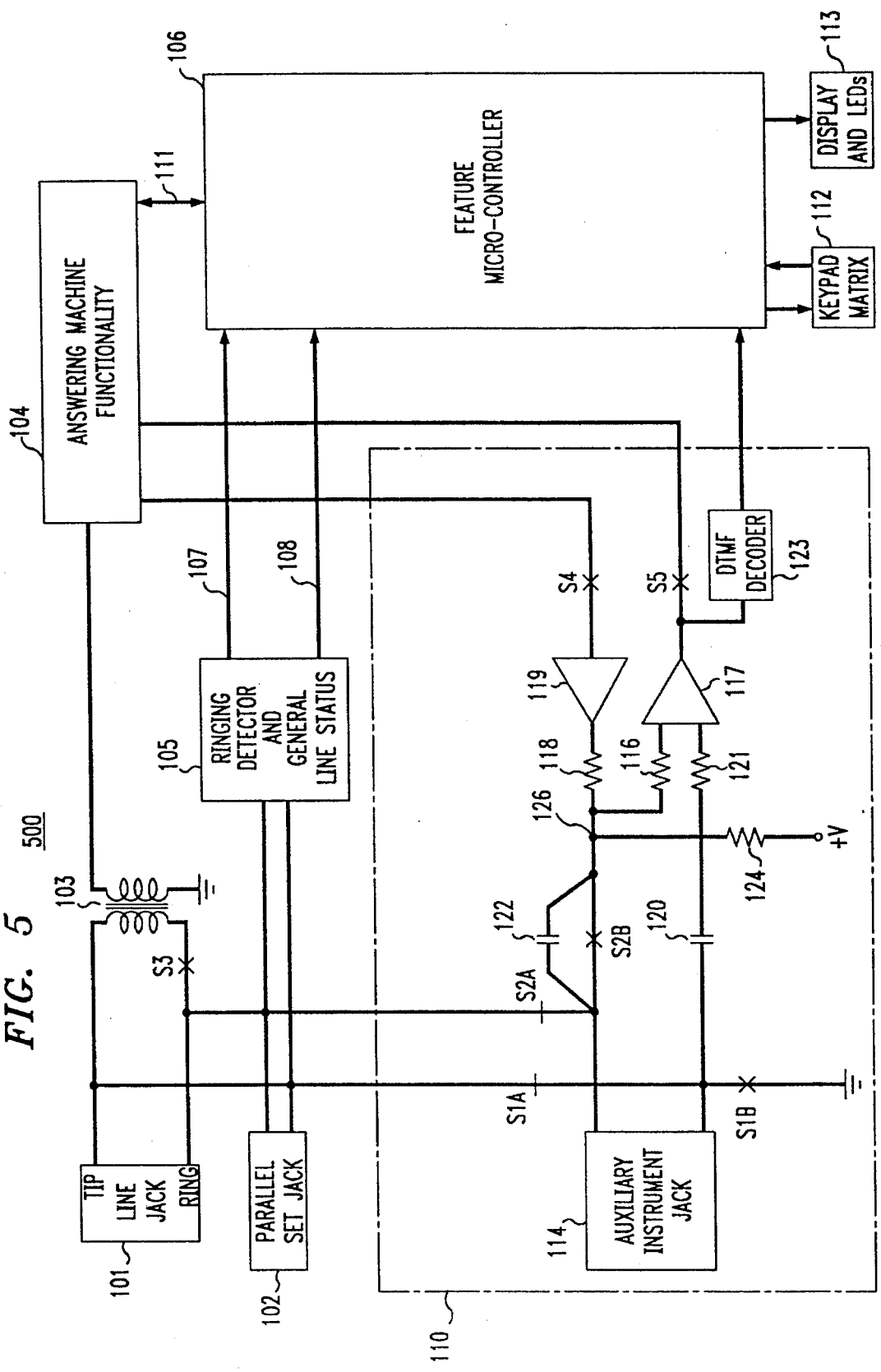
FIG. 5 shows in simplified block diagram form details of a telephone answering machine including a second embodiment of the invention.

FIG. 5 shows in simplified block diagram form details of an answering machine 500 including a second embodiment of the invention. Elements of answering machine 500 which are identical to those in answering machine 100 shown in FIG. 1 have been similarly numbered and will not be described again in detail. The differences between answering machine 500 and 100 and their operation will be described. Note that in answering machine 500 elements 115 and 125 have been eliminated and that the positions of switch elements S1A and S1B and switch elements S2A and S2B have been reversed. Now, because S1A and S1B are initially closed and switch elements S1B and S2B are open, any auxiliary telephone instrument connected to auxiliary instrument jack 114 has immediate access to a telephone line connected to line jack 101. Thus, in answering machine 500, auxiliary instrument jack 114 is controllably connected to the tip and ring outputs of line jack 101 via switch elements S1A and S2A. Auxiliary instrument jack 114 is connected to answering machine functionality unit 104 via switch element S1B which is connected to ground potential and switch element S2B. Unidirectional paths are connected to auxiliary instrument jack 114 via switch elements S2B and S1B. Additionally, switch element S2B is bypassed by capacitor 122 Resistor 124 is connected between a source of potential +V and circuit point 126, which is connected via switch element S2B to the ring lead output of auxiliary instrument jack 114 and provides battery feed thereto.

Figure 6:
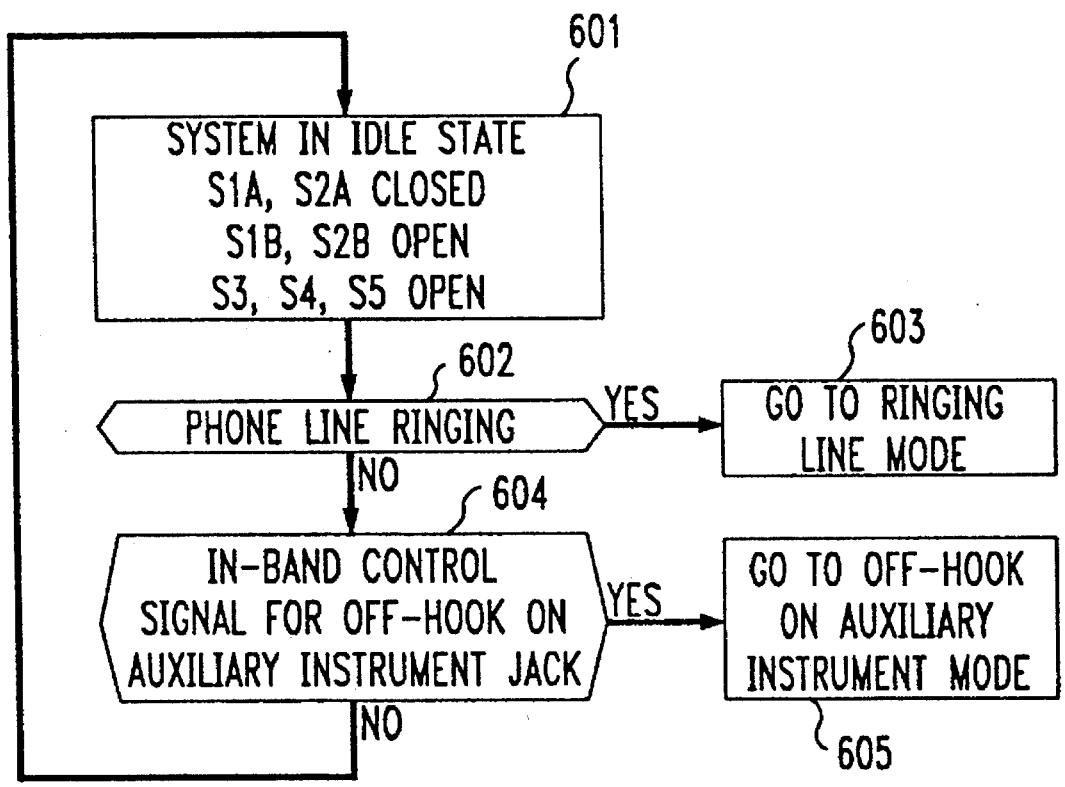
FIG. 6 is a flow chart illustrating the operation the embodiment of the invention shown in FIGS. 5 and 9.
Figure 7:
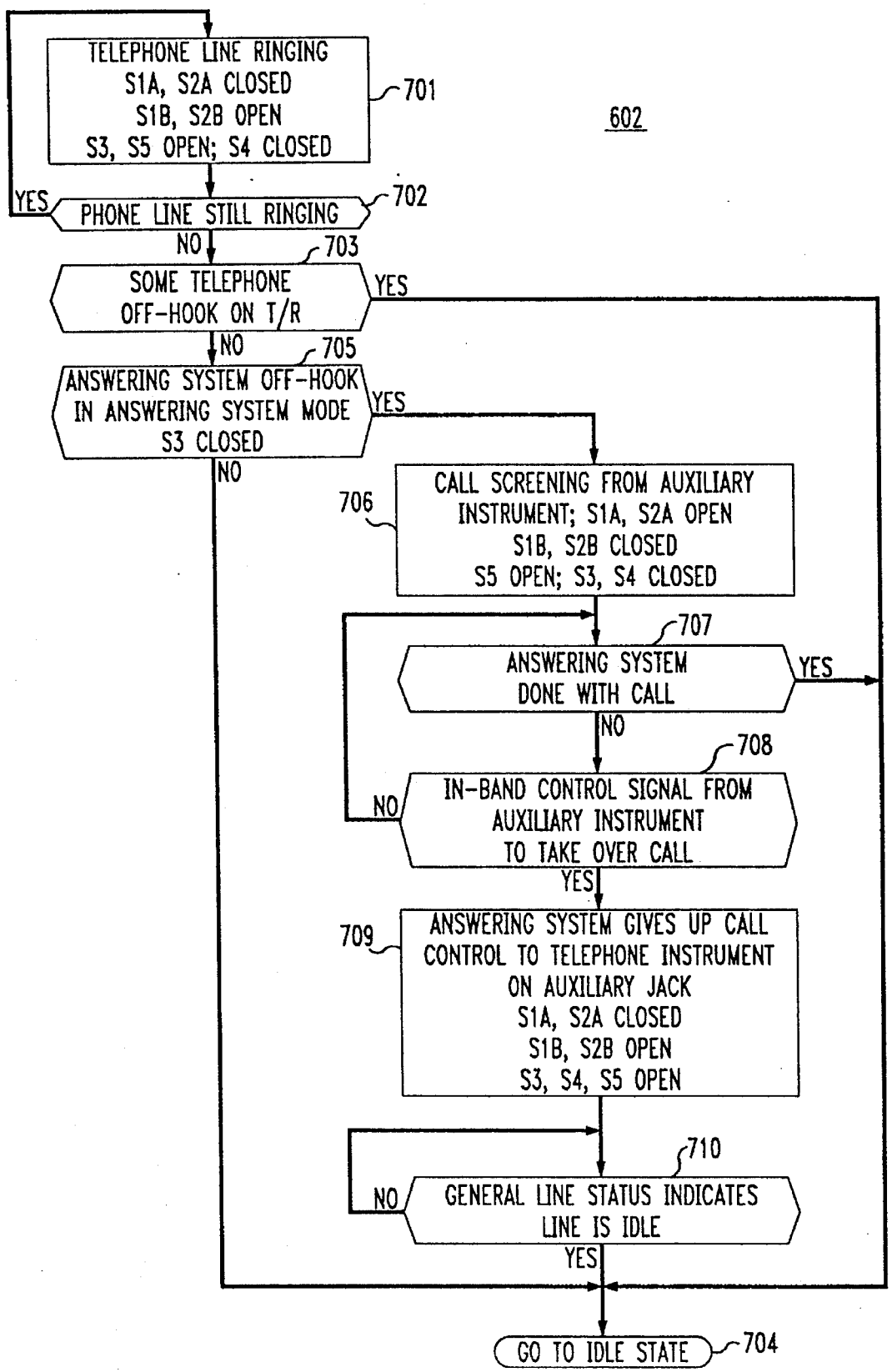
FIG. 7 is a flow chart illustrating the operation of the Go To Ringing Line mode subroutine employed in FIG. 6 for controlling the embodiment shown in FIG. 5.
Figure 8:
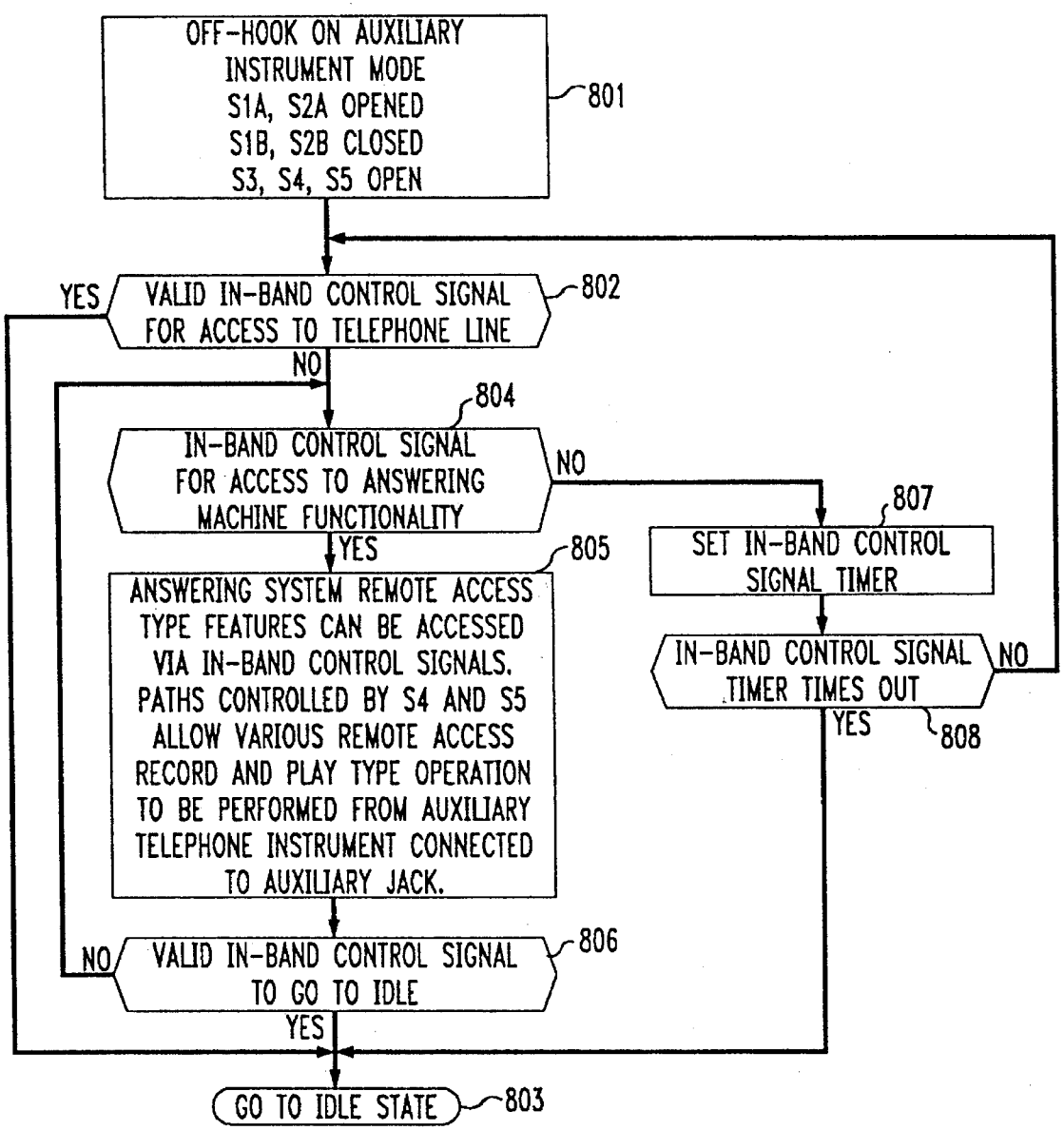
FIG. 8 is a flow chart illustrating the operation of the Go To Off-Hook On Auxiliary Instrument mode subroutine employed in FIG. 6 for controlling the embodiment shown in FIG. 5.

Operation of the embodiment of the invention shown in FIG. 5 may best be described by referring to the flow chart shown in FIG. 6. After the answering machine has been installed and power has been turned on, it will enter idle state 601. In idle state 601, switch elements S1A and S2A are closed. This closed condition of switch elements S1A and S2A connects the outputs of auxiliary instrument jack 114 to the outputs of line jack 101. Consequently, an auxiliary telephone instrument connected to auxiliary instrument jack 114 has immediate access to a telephone line connected to line jack 101. In the idle state 601, switch elements S1B and S2B are open, thereby disconnecting the tip and ring lead outputs of auxiliary instrument jack 114 from the answering machine functionality. Similarly, in idle state 601, switch element S3 is open and the answering machine is thereby in the on-hook state. Additionally, switch elements S4 and S5 are open, disconnecting the answering machine functionality unit 104 from the outputs of auxiliary instrument jack 114. Step 602 tests to determine whether or not a ringing signal is being received from the telephone line. If the test result in step 602 is YES, feature micro-controller 106 calls Go To Ringing Line mode subroutine via step 603. The Go To Ringing Line mode subroutine for answering machine 500 is shown in FIG. 7 and is described below. If the test result in step 602 is NO, step 604 tests to determine if there is an in-band control signal, e.g., a DTMF signal, present indicating that an auxiliary telephone instrument connected to auxiliary instrument jack 114 has gone off-hook. If the test result in step 604 is YES, feature micro-controller 106 calls the Go To Off-Hook On Auxiliary Instrument mode subroutine via step 605. The Go To Off-hook On Auxiliary Instrument mode subroutine for answering machine 500 is shown in FIG. 8 and described below. If the test result in step 604 is NO, control is returned to step 601 and the idle state is entered.

FIG. 7 is a flow chart illustrating the Go To Ringing Line mode subroutine 603 employed in the flow chart of FIG. 6. When ringing is detected, feature micro-controller 106 enters step 701. Switch elements S1A and S2A remain closed, switch elements S1B and S2B remain open, switch elements S3 and S5 remain open and switch element S4 is closed. Consequently, the tip and ring leads of auxiliary telephone jack 114 are remain connected to the outputs of line jack 101 and any telephone line connected thereto. Additionally, switch elements S1B and S2B being opened continues to disconnect the auxiliary instrument jack 114 from the the answering machine functionality. This allows a user of a telephone instrument connected to auxiliary instrument jack 114 to answer the incoming call if so desired. To this end, step 702 tests to determine whether the ringing signal continues to be detected. If the test result in step 702 is YES, steps 701 and 702 are iterated until the test result in step 702 is NO and the telephone line is no longer ringing. Then, step 703 tests to determine whether or not some other telephone instrument has gone off-hook on the tip and ring leads of the telephone line. This some other telephone instrument includes an auxiliary telephone instrument connected to auxiliary instrument jack 114. If the test result in step 703 is YES, step 704 transfers control back to idle state 601 (FIG. 6). If the test result in step 703 is NO, step 705 tests to determine if the answering system has gone off-hook and switch element S3 has been closed. If the test result in step 705 is NO, control is transferred back to idle state 601 (FIG. 6) via step 704. Returning to step 705, if the test result is YES and the answering machine has gone off-hook, step 706 allows a user of the auxiliary telephone instrument to privately screen the incoming call being supplied to the answering machine functionality unit 104. The screening path is from answering machine functionality unit 104 (FIG. 5) via switch S4, amplifier 119, resistor 118 and switch element S2B to auxiliary instrument jack 114 and from auxiliary instrument jack 114 via switch element S1B to ground potential. To this end, switch elements S1B and S2B are closed, switch elements S1A and S2A are open, switch element S5 is open and switch elements S3 and S4 are closed. Since switch elements S1B, S2B and S4 are closed and switch elements S1A, S2A and S5 are open, the user of the auxiliary telephone instrument can listen in, i.e., screen, the incoming call without being heard by the calling party. In this example, screening of the the incoming call is automatically available to a user if the auxiliary telephone instrument connected to auxiliary instrument jack 114 goes off-hook since switch element S4 is closed. The call screening function could easily be made into a manual function by leaving switch element S4 open and requiring the auxiliary telephone instrument user to enter an in-band control signal indicating that call screening is desired after going off-hook. Step 707 tests to determine if the answering system is done with the incoming call. If the test result in step 707 is YES, control is returned to the idle state 601 (FIG. 6) via step 704. If the test result in step 707 is NO, step 708 tests to determine whether an in-band control signal, e.g., a DTMF signal, from the auxiliary telephone instrument has been detected indicating that the user wishes to intercept the call. If the test result in step 708 is YES, step 709 causes the answering machine to give up call control to the auxiliary telephone instrument on auxiliary instrument jack 114. Thereafter, control is passed to step 710 which tests to determine whether the general line status is inactive, i.e., on-hook. If the test result is NO, step 710 is iterated until a YES result is obtained and control is returned to idle state 601 (FIG. 6) via step 704. Returning to step 708, if the test result is NO, steps 707 and 708 are iterated until either step 707 yields a YES result or step 708 yields a YES result. Thereafter, the operation is as described above.

FIG. 8 is a flow chart of the Go To Off-hook On Auxiliary Instrument mode subroutine 605, used in the flow chart of FIG. 6. Upon entering the Go To Off-hook On Auxiliary Instrument mode subroutine 605, step 801 causes switch elements S1A and S2A to be opened, S1B and S2B to be closed and switch elements S3, S4 and S5 to remain open. The condition of the switch elements is such as to allow a user of the auxiliary telephone instrument connected on auxiliary instrument jack 114 to access the answering machine functionality, if so desired. Step 802 tests to to determine if an in-band control signal, e.g., a DTMF signal, has been detected indicating that a user of the auxiliary telephone instrument connected to auxiliary instrument jack 114 wishes to access a telephone line connected to line jack 101. If the test result in step 802 is YES, step 803 passes control back to the idle state 601 (FIG. 6). If the test result in step 802 is NO, step 804 tests to determine if an in-band control signal, e.g., a DTMF signal, has been detected via DTMF decoder 123 (FIG. 1). If the test result in step 804 is YES, step 805 causes switch elements S4 and S5 to be closed, thereby allowing remote access via in-band control signals, e.g., DTMF signals, from the auxiliary telephone instrument connected to auxiliary instrument jack 114 to access operations of answering machine functionality unit 104 (FIG. 1). Thereafter, step 806 tests to determine if an in-band control signal. e.g., a DTMF signal, has been detected indicating that the answering machine should return to the idle state. If the test result in step 806 is NO, control is returned to step 804 and steps 804, 805 and 406 are iterated until either a NO result is obtained in step 804 or a YES result is obtained in step 806. A YES result in step 806 indicates that the auxiliary telephone instrument user has completed his or her interaction with the answering machine functionality. Upon step 806 yielding a YES result, control is passed to idle state 601 (FIG. 6) via step 803. Returning to step 804, if the test result is NO, step 807 causes an in-band control signal timer to be set to a predetermined timer interval. Then, step 808 tests to determine if the timer of step 807 has timed out. If the test result in step 808 is YES, control is returned to step 802 and appropriate ones of the steps 802, and 804–808 are iterated until either step 806 or 808 yields a YES result and control is passed to idle state 601 (FIG. 6) via step 803. When step 808 yields a YES result the timer set in step 807 has timed out.

Figure 9:
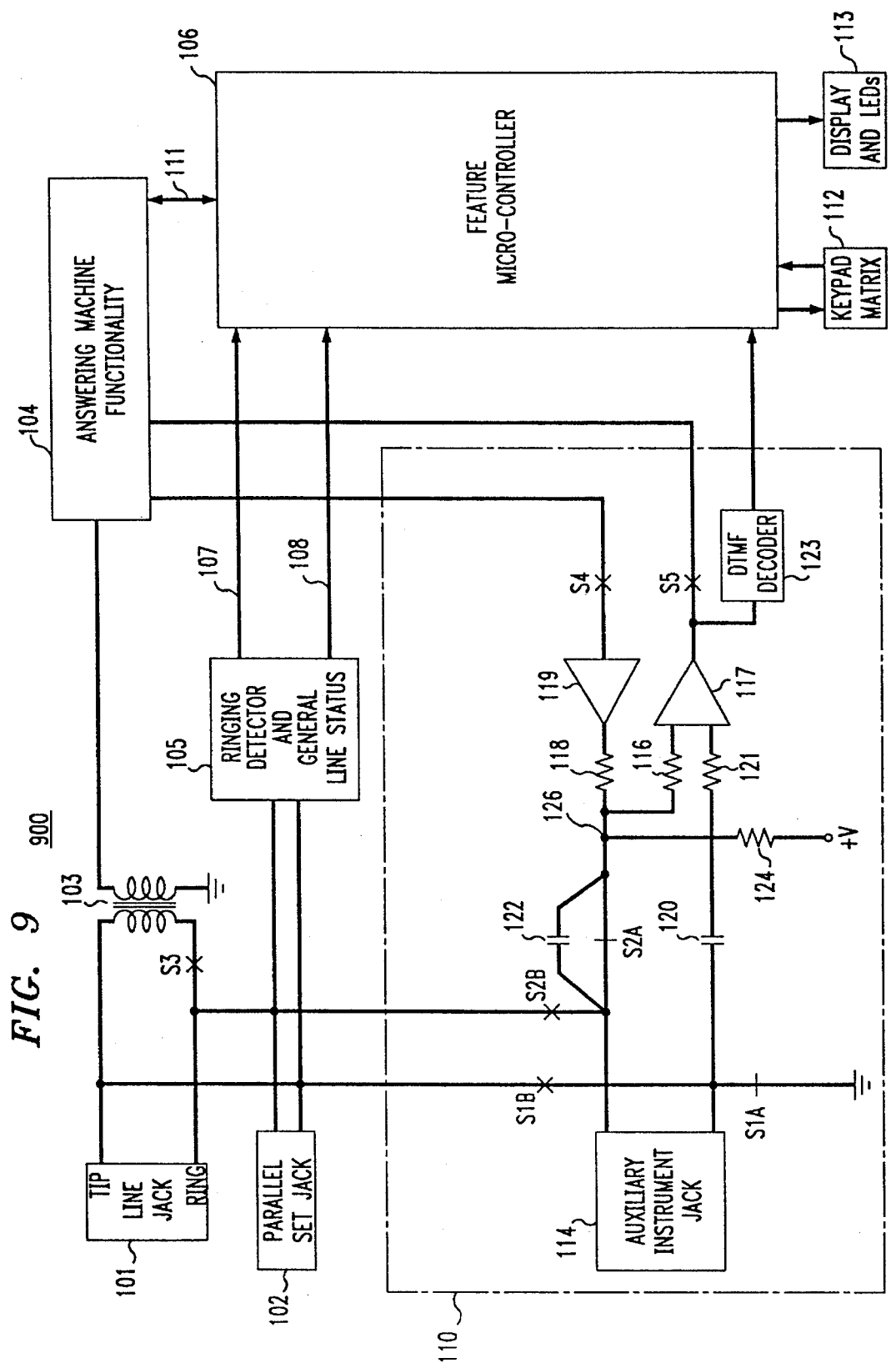
FIG. 9 shows in simplified block diagram form details of a telephone answering machine including a third embodiment of the invention.

FIG. 9 shows in simplified block diagram form details of an answering machine 900 including a third embodiment of the invention. Elements of answering machine 900 which are identical to those in answering machine 100 shown in FIG. 1 have been similarly numbered and will not be described again in detail. The differences between answering machine 900 and 100 and their operation will be described. Note that in answering machine 900 elements 115 and 125 have been eliminated. Resistor 124 is connected between a source of potential +V and circuit point 126, which is connected via switch element S2A to the ring lead output of auxiliary instrument jack 114 and provides battery feed thereto.

Figure 10:
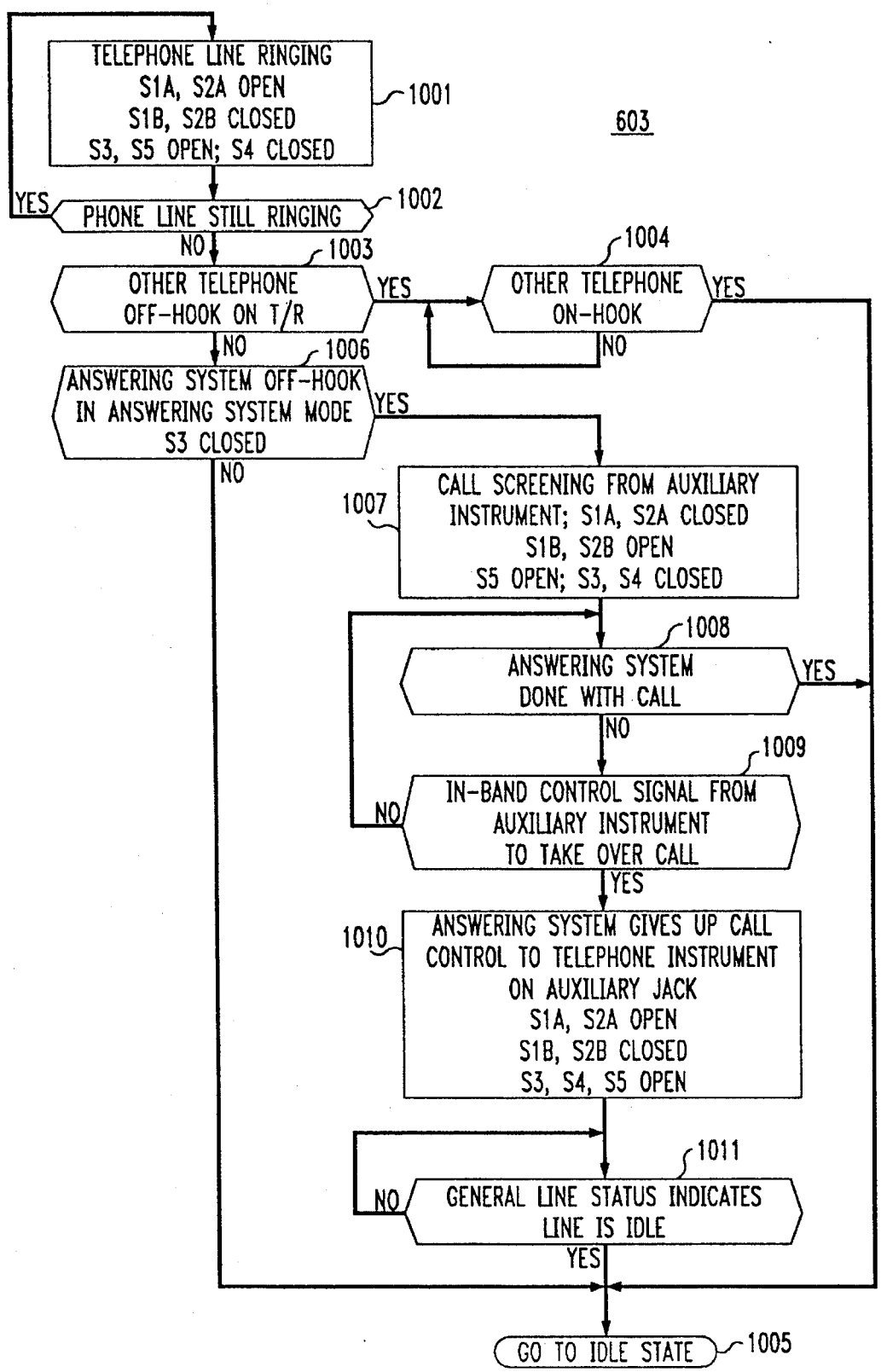
FIG. 10 is a flow chart illustrating the operation of the Go To Ringing Line mode subroutine employed in FIG. 6 for controlling the embodiment shown in FIG. 9.
Figure 11:
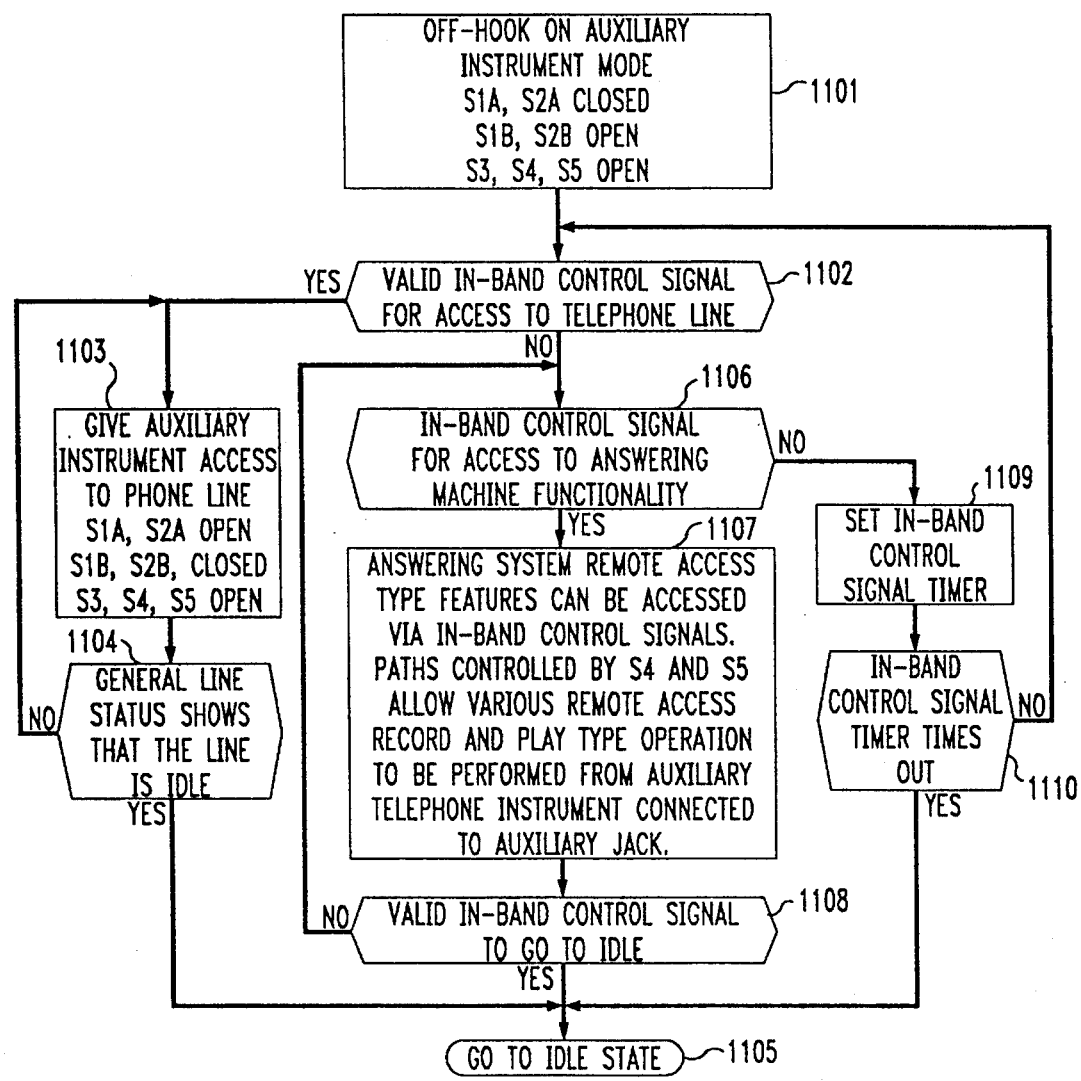
FIG. 11 is a flow chart illustrating the operation of the Go To Off-Hook On Auxiliary Instrument mode subroutine employed in FIG. 6 for controlling the embodiment shown in FIG. 9.

Operation of the embodiment of the invention shown in FIG. 9 may best be described by referring to the flow chart shown in FIG. 6. When the answering machine is turned on, it will enter idle state 601. In idle state 601, switch elements S1A and S2A are closed. This closed condition of switch elements S1A and S2A connects the outputs of auxiliary instrument jack 114 to be accessible to the answering machine functionality. In the idle state 601, switch elements S1B and S2B are open, thereby disconnecting the tip and ring lead outputs of auxiliary instrument jack 114 from the outputs of line jack 101. Similarly, in idle state 601, switch element S3 is open and the answering machine is thereby in the on-hook state. Additionally, switch elements S4 and S5 are open, disconnecting the answering machine functionality unit 104 from the outputs of auxiliary instrument jack 114. Step 602 tests to determine whether or not a ringing signal is being received from the telephone line. If the test result in step 602 is YES, feature micro-controller 106 calls Go To Ringing Line mode subroutine via step 603. The Go To Ringing Line mode subroutine for answering machine 900 is shown in FIG. 10 and is described below. If the test result in step 602 is NO, step 604 tests to determine if there is an in-band control signal, e.g., a DTMF signal, present indicating that an auxiliary telephone instrument connected to auxiliary instrument jack 114 has gone off-hook. If the test result in step 604 is YES, feature micro-controller 106 calls the Go To Off-Hook On Auxiliary Instrument mode subroutine via step 605. The Go To Off-hook On Auxiliary Instrument mode subroutine for answering machine 900 is shown in FIG. 11 and described below. If the test result in step 604 is NO, control is returned to step 601 and the idle state is entered.

FIG. 10 is a flow chart illustrating the Go To Ringing Line mode subroutine 603 employed in the flow chart of FIG. 6 for answering machine 900. When ringing is detected, feature micro-controller 106 enters step 1001. Switch elements S1A and S2A are caused to be open, switch elements S1B and S2B are caused to be closed, switch elements S3 and S5 remain open and switch element S4 is closed. Consequently, the tip and ring leads of auxiliary telephone jack 114 are connected to the outputs of line jack 101 so that ringing is available to the auxiliary telephone instrument. Therefore, a user of the auxiliary telephone instrument can answer the call, if so desired. Additionally, switch elements S1A and S2A being closed disconnects the outputs from auxiliary instrument jack from the answering machine functionality. Step 1002 tests to determine whether the ringing signal continues to be detected. If the test result in step 1002 is YES, steps 1001 and 1002 are iterated until the test result in step 1002 is NO and the telephone line is no longer ringing. Then, step 1003 tests to determine whether or not another telephone instrument has gone off-hook on the tip and ring leads of the telephone line. If the test result in step 1003 is YES, step 1004 tests to determine if the other telephone instrument has gone on-hook indicating that it is done with the call. If the test result in step 1004 is NO, the step is iterated until a YES result is obtained. This YES result indicates that the other telephone instrument is done with the call and control is returned to idle state 601 (FIG. 6) via step 1005. Returning to step 1003, if the test result is NO, step 1006 tests to determine if the answering system has gone off-hook and switch element S3 has been closed. If the test result in step 1006 is NO, control is transferred back to idle state 601 (FIG. 6) via step 1005. If the test result in step 1006 is YES and the answering machine has gone off-hook, step 1007 allows a user of the auxiliary telephone instrument to privately screen the incoming call being supplied to the answering machine functionality unit 104. The screening path is from answering machine functionality unit 104 (FIG. 9) via switch S4, amplifier 119, resistor 118 and switch element S2A to auxiliary instrument jack 114 and from auxiliary instrument jack 114 via switch element S1A to ground potential. To this end, switch elements S1A and S2A are closed, switch elements S1B and S2B are open, switch element S5 is open and switch elements S3 and S4 are closed. Since switch elements S1A, S2A and S4 are closed and switch elements S1B, S2B and S5 are open, the user of the auxiliary telephone instrument can listen in, i.e., screen the incoming call without being heard by the calling party. In this example, screening of the the incoming call is automatically available to a user if the auxiliary telephone instrument connected to auxiliary instrument jack 114 goes off-hook since switch element S4 is closed. The call screening function could easily be made into a manual function by leaving switch element S4 open and requiring the auxiliary telephone instrument user to enter an in-band control signal indicating that call screening is desired after going off-hook. Step 1008 tests to determine if the answering system is done with the incoming call. If the test result in step 1008 is YES, control is returned to the idle state 601 (FIG. 6) via step 1005. If the test result in step 1008 is NO, step 1009 tests to determine whether an in-band control signal, e.g., a DTMF signal, from the auxiliary telephone instrument has been detected indicating that the user wishes to intercept the call. If the test result in step 1009 is YES, step 1010 causes the answering machine to give up call control to the auxiliary telephone instrument on auxiliary instrument jack 114. This is effected by switch elements S1A and S2A being opened, switch elements S1B and S2B being closed and S3, S4 and S5 being open. Thereafter, control is passed to step 1011 which tests to determine whether the general line status is inactive, i.e., on-hook. If the test result is NO, step 1011 is iterated until a YES result is obtained and control is returned to idle state 601 (FIG. 6) via step 1005. Returning to step 1009, if the test result is NO, steps 1008 and 1009 are iterated until either step 1008 yields a YES result or step 1009 yields a YES result. Thereafter, the operation is as described above.

FIG. 11 is a flow chart of the Go To Off-hook On Auxiliary Instrument mode subroutine 605, used in the flow chart of FIG. 6 for answering machine 900. Upon entering the Go To Off-Hook On Auxiliary Instrument mode subroutine 605, step 1101 switch elements S1A and S2A are closed, S1B and S2B are open and switch elements S3, S4 and S5 are open. The condition of the switch elements is such as to allow a user of the auxiliary telephone instrument connected on auxiliary instrument jack 114 to access the answering machine functionality, if so desired. Step 1102 tests to to determine if an in-band control signal, e.g., a DTMF signal, has been detected indicating that a user of the auxiliary telephone instrument connected to auxiliary instrument jack 114 wishes to access a telephone line connected to line jack 101. If the test result in step 1102 is YES, step 1103 causes switch elements S1A and S2A to be opened, switch elements S1B and S2B to be closed and switch elements S3, S4 and S5 remain open. Then, step 1104 tests whether the general line status shows that the telephone line is inactive. If the test result in step 1104 is NO, steps 1103 and 1104 are iterated until step 1104 yields a YES result. This YES result indicates that the call is completed and control is returned to idle state 601 (FIG. 6) via step 1105. Returning to step 1102, if the test result is NO, step 1106 tests to determine if an in-band control signal, e.g., a DTMF signal, has been detected via DTMF decoder 123 (FIG. 1). If the test result in step 1106 is YES, step 1107 causes switch elements S4 and S5 to be closed, thereby allowing remote access via in-band control signals, e.g., DTMF signals, from the auxiliary telephone instrument connected to auxiliary instrument jack 114 to access operations of answering machine functionality unit 104 (FIG. 1). Thereafter, step 1108 tests to determine if an in-band control signal. e.g., a DTMF signal, has been detected indicating that the answering machine should return to the idle state. If the test result in step 806 is NO, control is returned to step 1106 and steps 1106, 1107 and 1108 are iterated until either a NO result is obtained in step 1106 or a YES result is obtained in step 1108. A YES result in step 1108 indicates that the auxiliary telephone instrument user has completed his or her interaction with the answering machine functionality. Upon step 1108 yielding a YES result, control is passed to idle state 601 (FIG. 6) via step 1105. Returning to step 1106, if the test result is NO, step 1109 causes an in-band control signal timer to be set to a predetermined timer interval. Then, step 1110 tests to determine if the timer of step 1109 has timed out. If the test result in step 1110 is NO, control is returned to step 1105 and appropriate ones of the steps 1102–1104 and 1106–1110 are iterated until either of steps 1104, 1108 or 1110 yields a YES result and control is passed to idle state 601 (FIG. 6) When step 1110 yields a YES result the timer set in step 1109 has timed out.

I claim:

1. A telephone answering machine arrangement comprising:

means for providing answering machine functionality;

first connector means having first and second inputs adapted for being connected to a telephone line and first and second outputs for coupling to said means for providing answering machine functionality;

second connector means having first and second inputs adapted for being connected to an auxiliary telephone instrument and having first and second outputs;

a plurality of controllable switch elements; and controller means responsive to at least one in-band control signal for controlling states of predetermined ones of said controllable switch elements for establishing one of two operating states of said first and second outputs of said second connector means, wherein one of said operating states of said first and second outputs of said second connector means is to connect said first and second outputs of said second connector means on a one-to-one basis to said first and second outputs of said first connector means and the other of said operating states of said first and second outputs of said second connector means is to provide accessibility of said first and second outputs of said second connector means to said means for providing answering machine functionality.

2. The invention as defined in claim 1 further including means for providing battery feed to said outputs of said second connector means.

3. The invention as defined in claim 2 where said battery feed is inhibited from being supplied to said outputs of said second connector means by predetermined ones of said controllable switch elements when said outputs of said second connector means are connected to the outputs of said first connector means.

4. The invention as defined in claim I further including a transmit path coupled to said means for providing answering machine functionality and to said outputs of said second connector means, one of said controllable switch elements being in said transmit path for connecting and disconnecting said transmit path from said means for providing answering machine functionality, and said controller means being response to states of said means for providing answering machine functionality for enabling and disabling said one of said controllable switch elements in said transmit path to connect and disconnect said transmit path to and from, respectively, said means for providing answering machine functionality.

5. The invention as defined in claim 1 further including a transmit path coupled to said means for providing answering machine functionality and to said outputs of said second connector means, one of said controllable switch elements being in said transmit path for connecting and disconnecting said transmit path from said means for providing answering machine functionality, and said controller means being responsive to states of said means for providing answering machine functionality for enabling and disabling said one of said controllable switch elements in said transmit path to connect and disconnect said transmit path to and from, respectively, said means for providing answering machine functionality and being additionally responsive to a predetermined in-band control signal for enabling others of said controllable switch elements to connect said transmit path to said outputs of said second connector means.

6. The invention as defined in claim 1 further including a receive path coupled to said outputs of said second connector means and to said means for providing answering machine functionality, one of said controllable switch elements being in said receive path for connecting and disconnecting said receive path from said means for providing answering machine functionality and, said controller means being response to a predetermined in-band control signal for enabling said one of said controllable switch elements to connect said receive path to said means for providing answering machine functionality.

7. The invention as defined in claim 6 wherein said controller means is further responsive to the state of said means for providing answering machine functionality for disabling said one of said controllable switch elements in said receive path to disconnect said receive path from said means for providing answering machine functionality.

8. The invention as defined in claim 7 further including means in circuit relationship with said receive path for detecting predetermined in-band control signals.

9. The invention as defined in claim 8 wherein said means for detecting detects in-band tone control signals.

10. The invention as defined in claim 9 wherein said in-band control signals are DTMF signals.

11. The invention as defined in claim 1 wherein said means for providing answering machine functionality can detect an incoming ringing signal and can answer an incoming call identified by said ringing signal, said controller means being responsive to a state of said means for providing answering machine functionality indicating that said call has been answered and being responsive to a predetermined in-band control signal for controlling predetermined ones of said controllable switch elements for connecting said outputs of said second connector means on a one-to-one basis to said outputs of said first connector means.

12. The invention as defined in claim 1 wherein said controller means is responsive to an in-band control signal representative of an active state of said outputs of said second connector means for connecting said outputs of said second connector means on a one-to-one basis to said outputs of said first connector means, said connection being delayed by a predetermined interval.

13. The invention as defined in claim 1 wherein said controller means is responsive to a predetermined in-band control signal for requesting connection of said outputs of said second connector means on a one-to-one basis to said outputs of said first connector means.

14. The invention as defined in claim 13 wherein said predetermined in-band control signal requesting connection is an in-band tone control signal being supplied via said outputs of said second connector means.

* * * * *